US006455964B1

(12) United States Patent
Nims

(10) Patent No.: US 6,455,964 B1
(45) Date of Patent: Sep. 24, 2002

(54) MICROTURBINE COOLING SYSTEM

(75) Inventor: Robert A. Nims, Rancho Palos Verdes, CA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/876,272

(22) Filed: Jun. 6, 2001

Related U.S. Application Data

(62) Division of application No. 09/468,724, filed on Dec. 21, 1999, now Pat. No. 6,246,138.
(60) Provisional application No. 60/113,839, filed on Dec. 24, 1998.

(51) Int. Cl.$^7$ .............................. H02K 5/16; H02K 9/00
(52) U.S. Cl. ........................ 310/90; 310/59; 417/366; 62/209; 184/6.16; 418/96
(58) Field of Search .............................. 310/90, 58, 59, 310/60 R, 61–63, 60 A; 62/209, 217, 228.5, 508; 417/423.12, 423.14, 437; 384/100–114; 33/503, 517, 504, 1 M, DIG. 2; 184/6.16, 6.17, 31; 418/96–99

(56) References Cited

U.S. PATENT DOCUMENTS

| | | | |
|---|---|---|---|
| 3,639,791 A | 2/1972 | Jenkin | |
| 4,167,295 A | 9/1979 | Glaser | |
| 4,644,851 A | 2/1987 | Young | 417/437 |
| 4,652,148 A * | 3/1987 | Olasz | 310/90 |
| 4,717,263 A | 1/1988 | Phillips | 384/123 |
| 5,012,896 A | 5/1991 | Costa | 184/6.16 |
| 5,113,670 A | 5/1992 | McAuliffe et al. | |
| 5,248,245 A | 9/1993 | Behnke et al. | 417/366 |
| 5,347,723 A | 9/1994 | Russell | 33/503 |
| 5,791,868 A | 8/1998 | Bosley et al. | |
| 5,827,040 A | 10/1998 | Bosley et al. | |
| 5,834,870 A * | 11/1998 | Tokushima et al. | 310/90 |
| 5,857,348 A | 1/1999 | Conry | 62/209 |
| 6,017,184 A | 1/2000 | Aguilar et al. | |
| 6,057,619 A | 5/2000 | Domberg et al. | |
| 6,215,219 B1 * | 4/2001 | Hwang | 310/90 |
| 6,285,102 B1 * | 9/2001 | Matsuoka et al. | 310/90 |

* cited by examiner

Primary Examiner—Tran Nguyen
(74) Attorney, Agent, or Firm—William J. Zak, Jr., Esq.

(57) ABSTRACT

A microturbine engine core with gas bearings used to support a rotating group is provided, including methods of optimizing the engine core's performance. It is emphasized that this abstract is provided to comply with the rules requiring an abstract that will allow a searcher or other reader to ascertain quickly the subject matter of the technical disclosure. The abstract is submitted with the understanding that it will not be used to interpret or limit the scope or meaning of the claims.

13 Claims, 1 Drawing Sheet

MICROTURBINE COOLING SYSTEM

CROSS-REFERENCE TO RELATED APPLICATIONS

This application is a divisional of and claims priority from original application Ser. No. 09/468,724 filed on Dec. 21, 1999, and provisional application Ser. No. 60/113,839 filed on Dec. 24, 1998, which are incorporated herein by reference and are commonly assigned with the present application Ser. No. 09/468,724 now is U.S. Pat. No. 6,246,138.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

This invention relates generally to microturbine power generation systems and more particularly to a microturbine construction and method for providing improved stability and heat transfer through the microturbine engine core.

Microturbines are multi-fuel, modular distributed power generation units having multiple applications. They offer the capability to produce electricity at a lower cost per kilowatt than do central plants, and they do not require the installation of expensive infrastructure to deliver power to the end users. Thus, in parts of the world lacking the transmission and distribution lines of a basic electric infrastructure, commercialization of microturbines may be greatly expedited. In the United States and other countries already having a suitable electric infrastructure, distributed generation units will allow consumers of electricity to choose the most cost-effective method of electric service. In addition to primary power generation, microturbines also offer an efficient way to supply back-up power or uninterruptible power. Other applications for microturbines exist as well.

Structurally, engine cores of present-day microturbine power generating systems include a compressor, a turbine for converting gaseous heat energy into mechanical energy, and an electrical generator for converting the mechanical energy produced by the turbine into electrical energy. The electrical generator includes a rotor and a stator. The rotor is mechanically coupled to wheels of the turbine and the compressor. While some proposed designs for microturbines include oil-lubricated ball bearings, microturbines can advantageously incorporate gas bearings instead. As used herein, "air bearings" are a subset of gas bearings—for example, gas bearings in which the operating medium is air obtained from the environment surrounding the microturbine.

If gas bearings are used in a microturbine, the above-described combination of rotor, compressor and turbine are rotatably supported by the gas bearings. The gas bearings in a common configuration include fluid film journal and thrust bearings. A microturbine engine core that uses gas bearings includes a single moving part, which allows for low technical skill maintenance and a high level of reliability.

Because unwanted heat can be generated by the engine core of a microturbine power generating system, it is desirable to include design features that allow for cooling of the electrical generator components, including the stator and the electrical conductor therein (e.g., stator wires). When the stator is of conventional, multi-tooth design, one method for cooling the stator involves passing cooling fluid, such as water or glycol, through a sleeve that surrounds the stator to transfer stator heat to the fluid. The fluid then may be cooled in a heat exchanger and passed back through the cooling sleeve surrounding the stator. Alternatively, a continuous supply of cool water may be used and, after it is heated by the unwanted stator heat, passed outside the microturbine power generating system for other uses. However, while the use of a fluid-cooled conventional stator offers design opportunities, it also presents certain problems, including problems associated with a microturbine that uses gas bearings. Specifically, cooling of air bearings, a rotor, and a stator end turn becomes problematic. Furthermore, stator end turn cooling typically requires special cooling flow components.

In the present microturbine cooling system, however, air bearing cooling flow—which is already required—performs the secondary function of stator end turn cooling. Using the existing cooling flow system for stator end turn cooling results in a simpler, lower cost microturbine.

Additionally, it is well known that air bearing damping and load capacity are a function of their operating pressure. The design arrangement of the present invention operates the air bearings at or near their highest possible pressures, resulting in a significant improvement in rotor dynamic stability because of improved bearing damping and load capacity. The present invention offers several other advantages as well.

BRIEF DESCRIPTION OF THE DRAWINGS

The details and features of the present invention will be more clearly understood with respect to the detailed description and drawing in which.

DESCRIPTION OF THE INVENTION

Figure 1:
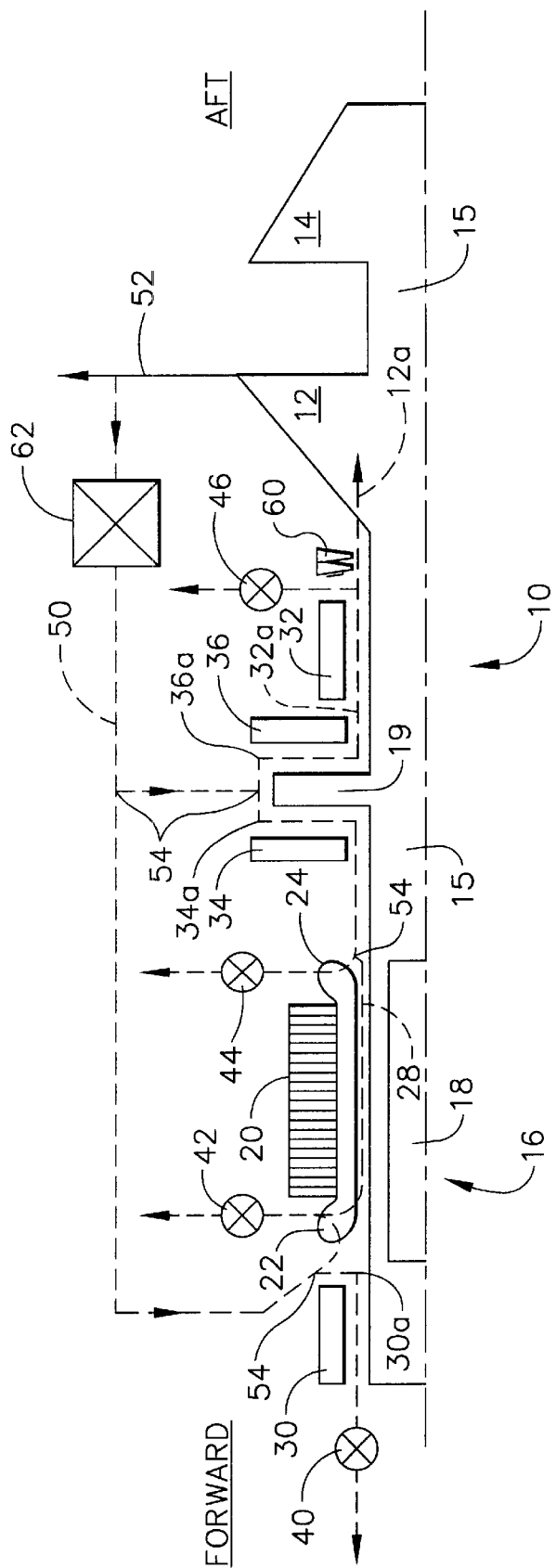
FIG. 1 is a representative side view of a microturbine cooling system constructed according to the present invention.

A microturbine power generating system that uses the present invention has a microturbine core 10 that includes a compressor 12, a turbine 14 for converting gaseous heat energy into mechanical energy, and an electrical generator 16 for converting the mechanical energy produced by the turbine into electrical energy. The electrical generator includes a rotor 18 and a stator 20. The rotor, which may advantageously be a rare earth permanent magnet rotor, is mechanically coupled to wheels of the turbine and the compressor; in the embodiment depicted in FIG. 1, these components are linked by shaft 15. The engine core also includes thrust disk 19, which is either integral to (part of) the shaft or a separate piece secured to the shaft. As used in the claims, the phrase "the shaft includes a thrust disk" applies to each of the embodiments in the foregoing sentence. The rotor, compressor and turbine are rotatably supported by gas bearings, including forward journal bearing 30, aft journal bearing 32, and thrust bearings 34 and 36. The thrust disk rotates between the thrust bearings.

In the microturbine cooling system disclosed and claimed herein, flow control devices 40, 42, 44, and 46 are employed to keep the air bearing pressures high. These flow control devices include known devices for controlling or restricting the flow of gas or air, such as orifices, seals, and valves. As shown in FIG. 1 by the lines and directional arrows depicting cooling flow 50, all the flow control devices are arranged downstream of the air bearing components, which results in the air bearing cooling system operating at or near the full discharge pressure of the compressor. Compressor discharge flow 52 is also depicted in the figure by the line and directional arrow extending from the compressor. The cooling circuit can advantageously include a cooling device 62 for removing some of the heat of the compressed air before the compressed air flows through the air bearings. The cooling device is chosen from the group that includes, for instance, air-to-air heat exchangers and liquid-to-air heat exchangers. The temperature of the compressed air that becomes cooling flow 50 is lowered by the transfer of heat to the cooling medium (not shown) of cooling device 62. The cooling medium in a liquid-to-air heat exchanger is commonly water, glycol or oil, although other liquids can be used. The cooling medium flows through an open loop or closed loop, and can also function to remove heat from other portions of a microturbine power generating system.

In addition to the downstream arrangement of the flow control devices in the air cooling circuit of the present invention, the air cooling circuit is constructed so that much of the cooling air that is routed to forward stator end turn 22 does not pass over—and consequently is not heated by—other sources of power loss such the thrust and journal bearings or rotor windage. This is done by splitting the flow of the cooling air and redirecting some of the cooling air from the main cooling air supply line (either internally or externally) and routing it to the vicinity of the forward end turn of the stator. The air flow is split when it reaches one or more junctions 54 in the cooling circuit. Similarly, cooling air flow to aft stator end turn 24 is only exposed to one thrust bearing heat source but no others.

The split cooling flow circuit of the present invention also ensures that none of the air bearing cooling flow entrances 30a, 32a, 34a and 36a are exposed to potentially contaminated cooling air that has passed through the stator end turns or the rotor gap 28. Thus, the potential for contamination of the air bearings by foreign objects coming from the permanent magnet generator, stator, insulation, varnish, wire ties, or other permanent magnet generator is substantially reduced, in turn reducing the probability of air bearing failure.

On the aft journal bearing another unique design feature has been incorporated into the microturbine cooling system. Instead of allowing the heated air bearing cooling flow to exhaust into and mix with the main compressor inlet process flow, a labyrinth shaft seal 60 is employed to redirect that flow and vent it overboard. Reducing the amount of heat that enters the process flow of compressor inlet 12a serves to maximize the performance of the microturbine core.

The invention now having been described in detail, those skilled in the art may recognize modifications and substitutions to the specific embodiments disclosed herein. Such modifications and substitutions are within the scope and intent of the present invention, as set forth in the following claims.

What is claimed is:

1. A method for cooling and for optimizing the operating pressure of gas bearings used to support a rotating group that includes a shaft and a compressor, the method comprising the steps of:

(a) supplying a portion of compressed air from the compressor to a cooling circuit, thereby creating an air flow in the cooling circuit;

(b) splitting the air flow in the cooling circuit, thereby creating at least a first separate flow path and a second separate flow path in the cooling circuit;

(c) flowing the air in the first separate flow path through at least one of said gas bearings and then through a first flow control device; and (d) flowing the air in the second separate flow path through at least another one of said gas bearings and then through a second flow control device.

2. The method of claim 1, wherein the shaft includes a thrust disk and the gas bearings include two thrust bearings adjacent either side of the thrust disk, and wherein step (c) includes flowing the air in the first separate flow path through one of the thrust bearings and step (d) includes flowing the air in the second separate flow path through the other of the thrust bearings.

3. The method of claim 2, wherein the gas bearings further include at least one journal bearing supporting the shaft radially, and wherein step (c) further includes flowing the air in the first separate flow path through said journal bearing.

4. The method of claim 2, wherein step (a) includes passing the portion of compressed air from the compressor through a cooling device.

5. The method of claim 2, wherein the rotating group further includes a rotating portion of an electrical machine, wherein the gas bearings further include two journal bearings supporting the shaft radially on opposite sides of the rotating portion of the electrical machine, wherein step (b) includes splitting the air flow into at least a first, second and third separate flow paths, comprising the additional step of:

(e) flowing the air in the third separate flow path through one of the journal bearings and then through a third flow control device.

6. The method of claim 2, wherein step (c) further includes employing a labyrinth shaft seal to direct the air in the first separate flow path away from the compressor en route to the first flow control device.

7. A method for cooling an electrical generator used in a power generating system, the electrical generator including a rotatable generator rotor and a fixed electrical conductor, the electrical conductor having forward and aft end turns, the method comprising the steps of:

(a) supplying a portion of compressed air to a cooling circuit, thereby creating an air flow in the cooling circuit;

(b) splitting the air flow in the cooling circuit, thereby creating at least a first separate flow path and a second separate flow path in the cooling circuit;

(c) flowing the air in the first separate flow path over the forward end turn and then flowing at least a portion of the air in the first separate flow path through a first flow control device and outside of the cooling circuit;

(d) flowing the air in the second separate flow path over the aft end turn and then flowing at least a portion of the air in the second separate flow path through a second flow control device and outside of the cooling circuit.

8. The method of claim 7, wherein the power generating system has a rotating group, including a shaft and a compressor, rotatably supported on gas bearings, and wherein at least one of steps (c) or (d) includes substantially preventing the air flow in the cooling circuit from passing through any of said gas bearings en route to the end turns of the electrical conductor.

9. The method of claim 8, wherein step (c) further includes employing a labyrinth shaft seal to direct the air in the first separate flow path away from the compressor en route to the first flow control device.

10. The method of claim 8, wherein the shaft includes a thrust disk and the gas bearings include two thrust bearings adjacent either side of the thrust disk, and wherein step (c) includes flowing the air in the first separate flow path through only one of the thrust bearings en route to the aft end turn, and step (d) includes substantially preventing the air flow in the second separate flow path from passing through any of said gas bearings en route to the forward end turn.

11. The method of claim 10, wherein the gas bearings further include two journal bearings supporting the shaft radially on opposite sides of the rotatable generator rotor, comprising the additional steps of:

(e) prior to step (c), splitting the first separate flow path into branch paths 1-a and 1-b;

(f) in step (c), flowing the air in branch path 1-a through one of the thrust bearings en route to the aft end turn;

(g) flowing the air in branch path 1-b through the other of the thrust bearings, through one of the journal bearings, through a third flow control device, and outside of the cooling circuit;

(h) prior to step (d), splitting the second separate flow path into branch paths 2-a and 2-b;

(i) in step (d), flowing the air in branch path 2-a over the aft end turn; and (j) flowing the air in the branch path 2-b through the other journal bearing, through a fourth flow control device, and outside of the cooling circuit.

12. The method of any of claim 7, 8 or 11, wherein step (a) includes passing the portion of compressed air through a cooling device.

13. The method of claim 11, wherein step (g) includes employing a labyrinth shaft seal to direct the air in branch path 1-b away from the compressor en route to the third flow control device.

* * * * *